Patented Nov. 19, 1935

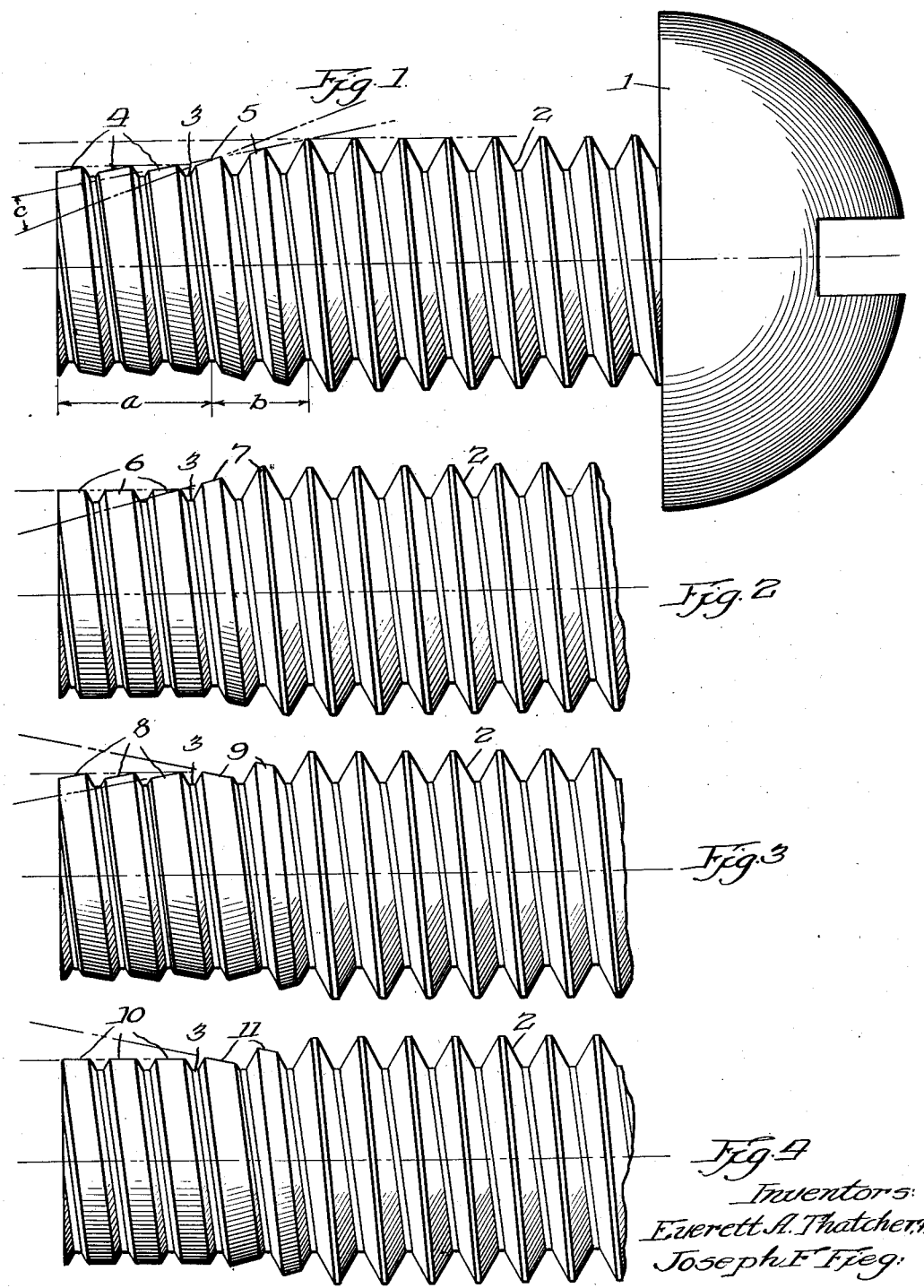

2,021,704

UNITED STATES PATENT OFFICE 2,021,704

SCREW

Everett A. Thatcher, Winnetka, and Joseph F. Fieg, La Grange, Ill., assignors to United Screw and Bolt Corporation, Chicago, Ill., a corporation of Ohio Application January 25, 1932, Serial No. 588,520

7 Claims. (Cl. 85—46)

This invention relates to screw threaded fastening devices adapted to form their own threads in metal or threadable material for securing the material together and more particularly such screws that are especially adapted for line assembly work.

In this type of work, it is customary to prepare unthreaded holes in the metal members to be secured together, and to insert the ends of screws in these holes and screw them home with an automatic power driven screw driver. Such assembly work presents several problems among which are to properly support the screw in position so that it may be engaged by a continuously operated screw driver without being dislodged, to construct the screw so that it will properly enter the prepared hole and not cant to one side, and to construct the entering end of the screw so that the first threads will "take hold" and cause the screw to readily form its thread in the assembly.

Heretofore case hardened screws and so-called self-tapping screws for use in unthreaded holes in sheet metal and other assemblage have been made with various forms of tapering, entering or pilot ends technically known as points to facilitate assembly. Incidentally in producing such a taper, resulting from a series of partially formed threads, advantage has been taken of a process condition hitherto considered unavoidable and inherent in the art of thread rolling which is the method used for producing the great bulk if not all of this kind of product. The preference for and prevalence of rolled threads is due to the superior thread produced thereby. Rolled threads have compressed smooth flanks and flank surfaces as distinguished from a cut and rather open and rough surface. The thread is stronger therebecause, turns with less friction and is more uniform, being independent of the condition of the cutting edges of the cutting tools.

This taper usually results from a series of only partially formed rolled threads, the degree of thread formation gradually diminishing as the end of the screw is approached. Depending upon necessary manufacturing variations, this gradual diminution of thread formation is haphazard, uncontrolled and irregular, resulting in varying degrees of taper and presenting sometimes one, sometimes the other edge of the partially formed thread for engagement with mouth and side walls of the unthreaded opening into which the screw is to be assembled.

It is the province of this invention to provide a screw especially well suited for the above purpose and which overcomes the above difficulties. In accordance with this invention a point is provided having a more nearly uniform taper and with particularly modified and well defined thread-crests unknown and unobtainable heretofore in rolled threads and of a form best suited to assembly requirements and characteristics as explained more fully hereinafter. In the preferred form the entering end or point of the screw is of lesser diameter than the major diameter of the screw, is cylindrical in form for a portion of its length and is provided with further means which will prevent the screw from tipping or becoming dislodged when engaged by a power screw driver. The latter means may conveniently be particularly formed end convolutions or threads extending preferably to the very end of the screw. The cylindrical entering end which is of less diameter than the prepared hole in the members being secured together, is preferably joined to the main body of the screw by a frusto-conical section having threads thereon which, due to their crest formation, "take hold" and cause the screw to enter the prepared hole and more readily form its mating thread. The minor or root diameter of thread and also the flank-bearing dimensions are preferably uniform throughout the entire length of the screw. By uniform "flank-bearing dimension" is meant that the distance from the axis of the screw to a given point on the flank on any thread on the screw point is equal to the distance from the axis of the screw to a corresponding point on the flank of any other thread on the screw point or body.

This results in a screw which may be assembled with a nut or other threaded hole of the same nominal thread size as the screw regardless of which of the several proposed crest modifications intended for assembly in unthreaded parts may be embodied on the screw point or end. In general the crests of the partially formed threads on either the inclined and/or cylindrical portions of the end of the screw are flat. The flat crests of the threads on the point may be arranged parallel to the axis of the screw or at varying angles. The flat crests on the cylindrical end may, if desired, be parallel to the axis of the screw or inclined thereto as may also be the threads on the connecting portion.

A better understanding of this invention will be had from the following description given in connection with the drawing in which:

Fig. 1 is a side elevation of a screw embodying the principles of this invention;

Fig. 2 is a similar view of a slightly modified thread crest formation;

Fig. 3 is a similar view of a still further modified crest formation; and

Fig. 4 is a similar view of another modified crest formation.

In each of the forms of this invention, a screw of conventional dimensions, is illustrated although it will be apparent that the principles of this invention may be applied to any type of screw regardless of size, dimension, and type of thread or head.

In Fig. 1 there is illustrated a screw having a round head 1 and a shank 2 threaded throughout its entire length and hardened. The threads are in reality a single thread comprising a series of connected helical convolutions preferably rolled and are illustrated as being of standard machine screw form and pitch which is satisfactory for most uses, although any other form and/or pitch may be used as is found desirable. As previously stated, the threads or convolutions are preferably rolled and the root diameter is preferably constant throughout the entire length of the screw. The shank is provided with a point or entering end 3 having end convolutions or threads of minor or root diameter and flank-bearing dimensions equal to that of the main portion of the screw insuring assembly in a threaded hole of the same thread size as that of the screw. For a distance "a" the end convolutions or threads have flat crests as at 4, and are of equal diameters, thus giving this portion of the point a cylindrical character. In the illustrated screw the first three end convolutions or threads preferably, although not necessarily, have their crests flat, the maximum diameter across the flats being less than the diameter across the crests of the full diameter threads or convolutions as shown by the dot-dash lines in Fig. 1. Furthermore, the flat topped crests are inclined inwardly toward the axis of the screw and toward the end of the screw. Preferably the maximum diameters of each of the flat topped crests are equal, as is the minimum diameter of each of the flat topped crests, i. e., a line connecting the high points of the crest surfaces is parallel to the axis of the screw. The resulting taper on the end or point of the screw facilitates assembly, also the "anchoring" effect is exceptionally noticeable on account of the flank exposure. These crest flats are definitely formed to obtain the above cylindrical characteristics and also to maintain the diameter of the point to within much closer limits than is possible when crests are merely the result of producing partially formed threads resulting from abnormal blanks and therefore the crest radii of which necessarily vary with variations in stock material and inaccuracies occurring in machines.

Obviously the cylindrical form of point held to close diameter variations reduces the amount of "canting" over what is encountered when a point of a less truly cylindrical form and made to greater varying diameters is employed. As already stated, the flank and minor diameter dimensions of the convolutions or threads on the point are such that the screw will assemble in a hole previously threaded. In addition to this feature these pilot threads have another function to perform, namely, the exposed flanks on the cylindrical portion of the point serve to prevent the screw from falling out of the assembly as readily as would be the case were a smooth point used.

For a further distance "b" the thread-crests are also flat topped as indicated at 5 and, as seen in side elevation or on any section made by a plane passing through the axis of the screw, the top flat crest surfaces are coincident with the lateral surface formed by the side and axis of a conical frustum whose maximum diameter equals the shank or body diameter of the screw, and whose minimum diameter equals the diameter of the cylindrical portion of the point and whose height equals distance "b". That is, in the illustrated screw there are two more flat crested threads or convolutions between the end threads or convolutions and the full threads on the screw body.

The flats on these crests, like the flats on the cylindrical portion of the point, are likewise of predetermined definite formation to obtain a tapering major diameter of thread conforming more nearly to a true conical form than can be obtained with thread-crests of irregularly varying length of radius such as are produced on flank edges of only partially formed rolled threads, created by reason of varying blank diameters of screw blanks as unavoidably occur in commercial production.

This portion of the point definitely formed to approach very nearly a true conical form is especially advantageous in keeping the axis of the screw in proper alignment with the axis of holes in assemblies when entering an unthreaded assembly.

The crest flats of the threads or convolutions on portion "b" are also inclined toward the axis and towards the end of the point but at a somewhat greater angle than that formed by the side of the imaginary cone with the axis of the screw. This results in a "crest clearance" as is shown at "c" which is the difference between the angle of the crest surface of the intermediate convolutions to the axis of the screw and the angle of the end convolutions or the lateral surface of the imaginary cone previously described, to the axis of the screw and concentrates more pressure at the intersection of the crest flat and the thread-flank. Variations of crest angle may be preferable under different assembly conditions as may be found advantageous.

In Fig. 1 the inclined flat crests of the end threads or convolutions facilitate entry into a preformed hole in the material being fastened and, due to their inclination, function as a sort of a wedge to maintain the screw in upright position to be engaged by the screw driver. The terminating end portion of the screw being cylindrical, any excessive canting of the screw is prevented should the inclined crest faces not be engaged tightly in the hole. Furthermore, if the entering end or point be only partially inserted in the preformed hole, the edges formed by the intersection of the flanks of the flat crested threads with the flat crests, engage the side walls of the preformed hole and prevent the screw from falling out. The intermediate flat crested threads serve as entering threads which "take hold" and cause the screw to form its mating thread with a minimum effort. In fact, it has been found that the screw will enter and form its own thread without any axial pressure being placed upon the screw.

In Figs. 2 to 4 are shown only the pointed shank portions 2 and thread-crests of various outline, each of which possesses value under peculiar assembly requirements. In the form of this invention shown in Fig. 2, the structure is substantially identical to that shown in Fig. 1 except that the three end convolutions 6 have their flat crests in alignment and parallel to the axis of the screw. The intermediate flat crested convolutions 7 are substantially identical to intermediate convolutions 5 in Fig. 1 but the crest angle is identical to the conical angle instead of being somewhat greater as in Fig. 1. For some assembly purposes this form might be preferred. In using this form of the invention, the prepared hole need be made only slightly larger than the diameter of the entering crests and the amount of "cant" can therefore be limited to a very slight degree.

In the form of invention shown in Fig. 3 the end convolutions 8 are formed with flat angled crests as in Fig. 1 whereas the intermediate and flat crested convolutions 9 are formed with their flat faces inclined outwardly toward the entering end of the screw instead of inwardly. This form is particularly desirable when the screw is used in metal members of relatively great thickness as the entering inclined convolution then function somewhat as cutting threads, rather than as kneading threads and provide a greater clearance for the full diameter threads, and therefore the latter threads enter more readily. That is, the intermediate threads perform a very slight "broach-like" action removing just enough metal as this portion of the point enters to make possible complete assembly of this screw in relatively greater thicknesses of metal with more ease than with the crest forms of other types.

In the form of invention shown in Fig. 4 the flat crested end convolutions 10 are parallel as illustrated in Fig. 2 and the intermediate convolutions 11 are flat crested and inclined outwardly as in Fig. 3. This form of the invention is of particular utility where it is desired to form the holes in the material with great accuracy and the additional cutting action is desired by the intermediate or entering threads.

From the foregoing description of each figure, it will be observed that in each case the root diameter is preferably constant throughout the entire length of the screw, that the full diameter convolutions and flat crested threads together preferably extend throughout the entire length of the screw, and that the screw may be said to be provided with a cylindrical entering or piloting end of less diameter than the shank of the screw, which piloting end preferably joins the shank of the screw through an intermediate frusto-conical section also of the shank, the latter section having piloting convolutions.

It is obvious that any one feature of any one illustrated form of this invention may be combined with any other feature of one or more of the other forms to suit particular purposes or applications. It will also be apparent to those skilled in the art that the form and pitch of the threads, the relative diameters of the several portions of the shank, their relative proportions and the length of the threaded portion may be varied to suit particular cases, in other words, that the illustrated embodiments are merely those forms which have proved satisfactory for general application and some specific applications.

We claim:

1. A thread-forming screw fastening device having a head and a body, the body being threaded with a single continuous uninterrupted thread throughout substantially its entire length, the crest diameters of a plurality of convolutions at the entering end of the screw being flat crested and equal to each other in diameter but of smaller diameter than the crest diameters of the convolutions upon the remainder of the screw, the flat crest surfaces of the convolutions at the entering end of the screw being inclined toward the entering end of the screw.

2. A thread-forming screw fastening device having a head and a body, the body being threaded with a single continuous uninterrupted thread of constant root diameter throughout substantially its entire length, a plurality of convolutions at the entering end of the screw each being flat crested and of equal diameters, but of smaller diameters than the crest diameters of the convolutions upon the remainder of the screw, the flat crested end convolutions being inclined toward the entering end of the screw.

3. A thread-forming screw fastening device having a head and a body, the body being roll threaded with a single continuous uninterrupted thread of constant root diameter throughout substantially its entire length, the flanks of each convolution being at equal angles to the axis of the body, the convolutions upon the entering end of said screw having flat crests of equal diameter but of smaller diameter than the crest diameters of the remainder of the convolutions and being joined to the remaining convolutions by flat crested convolutions of varying crest diameters, inclined toward the head of the screw.

4. A thread-forming screw fastening device having a head and a body, the body being threaded with a single continuous uninterrupted thread throughout substantially its entire length, the convolutions upon the entering end of said screw having flat crests of smaller diameter than the crest diameters of the remainder of the convolutions and being joined to the remaining convolutions by flat crested convolutions of varying crest diameters, the crest surfaces of the end flat crested convolutions being inclined inwardly toward the entering end of the screw and the crest surfaces of the intermediate joining flat crested convolutions being inclined toward the head of the screw.

5. A thread-forming screw fastening device having a head and a body, the body being threaded with a single continuous uninterrupted thread throughout substantially its entire length, the crest diameters of a plurality of convolutions at the entering end of the screw being flat-crested and equal to each other in diameter but of smaller diameter than the crest diameters of the convolutions upon the remainder of the screw, the flat crest surfaces of the convolutions at the entering end of the screw being inclined toward the entering end of the screw, and the convolutions of a portion of the remainder of the screw adjacent the smaller diameter convolutions having progressively increasing crest diameters toward the head of the screw.

6. A thread-forming screw having a single continuous uninterrupted hardened thread extending from the starting end of the screw toward the head thereof, said thread having guiding, thread-forming, and load-bearing portions, said load-bearing portion being nearest said head and of greatest crest diameter, said guiding portion being nearest the entering end and comprising a plurality of flat-crested convolutions of the same crest diameter smaller than the diameter of said load-bearing portion, said thread-forming portion being between said guiding and load-bearing portions and comprising a plurality of flat-crested convolutions of progressively increasing diameter toward said head from the diameter of said guiding portion to the diameter of said load-bearing portion.

7. A thread-forming screw having a single hardened thread extending from the starting end of the screw toward the head thereof, said thread having guiding, thread-forming, and load-bearing portions, said load-bearing portion being nearest said head and of greatest crest diameter, said guiding portion being nearest the entering end and comprising a plurality of flat-crested convolutions of the same crest diameter smaller than the diameter of said load-bearing portion, said thread-forming portion being between said guiding and load-bearing portions and comprising a plurality of flat-crested convolutions of progressively increasing diameter toward said head from the diameter of said guiding portion to the diameter of said load-bearing portion.

EVERETT A. THATCHER.
JOSEPH F. FIEG.